(12) United States Patent
Adamczyk et al.

(10) Patent No.: US 10,718,394 B2
(45) Date of Patent: Jul. 21, 2020

(54) DISK BRAKE FOR A UTILITY VEHICLE

(71) Applicant: KNORR-BREMSE Systeme fuer Nutzfahrzeuge GmbH, Munich (DE)

(72) Inventors: Philipp Adamczyk, Stoettwang (DE); Christian Scheufler, Munich (DE); Matthias Klingner, Moorenweis (DE)

(73) Assignee: KNORR-BREMSE Systeme fuer Nutzfahrzeuge Gmbh, Munich (DE)

( * ) Notice: Subject to any disclaimer, the term of this patent is extended or adjusted under 35 U.S.C. 154(b) by 0 days.

(21) Appl. No.: 15/461,813

(22) Filed: Mar. 17, 2017

(65) Prior Publication Data

US 2017/0191538 A1 Jul. 6, 2017

Related U.S. Application Data

(63) Continuation of application No. PCT/EP2015/071261, filed on Sep. 16, 2015.

(30) Foreign Application Priority Data

Sep. 17, 2014 (DE) .......................... 10 2014 113 370

(51) Int. Cl.
*F16D 55/08* (2006.01)
*F16D 65/18* (2006.01)
(Continued)

(52) U.S. Cl.
CPC .......... *F16D 65/18* (2013.01); *F16D 55/2255* (2013.01); *F16D 65/14* (2013.01);
(Continued)

(58) Field of Classification Search
CPC ............. F16D 2125/28; F16D 2125/64; F16D 2125/645; F16D 2125/66; F16D 55/2255;
(Continued)

(56) References Cited

U.S. PATENT DOCUMENTS 3,927,738 A 12/1975 Ernst
5,520,267 A * 5/1996 Giering ................. F16D 55/226
188/72.7
(Continued)

FOREIGN PATENT DOCUMENTS

CN 1206079 A 1/1999
CN 1821007 A 8/2006
(Continued)

OTHER PUBLICATIONS

Chinese-language Office Action issued in counterpart Chinese Application No. 201580056480.6 dated Jul. 3, 2018 with English translation (13 pages).
(Continued)

*Primary Examiner* — Nicholas J Lane
(74) *Attorney, Agent, or Firm* — Crowell & Moring LLP

(57) ABSTRACT

A disk brake for a utility vehicle is provided. A brake caliper of the disk brake includes a receiving chamber configured to receive a brake application device with a pivotable brake lever. The brake lever is supported at one end on a bridge supporting at least one brake piston and at the other end on a wall of the brake caliper forming a caliper head. A pivot bearing is provided for supporting the brake lever on the caliper head or the bridge. The pivot bearing includes a receptacle having a circular-arc-shaped cross-section and has a pivoting body configured to be located in the receptacle. The brake lever is retained in such a way that the brake lever is secured against displacement transversely to the pivoting direction of the brake lever by at least one securing element arranged in the region of the pivoting body extending axially on both sides of the securing element. The securing element protrudes radially in relation to the pivoting body at least in some regions and engages in a slot of the
(Continued)

caliper head or of the bridge having a circular arc shape in the pivoting direction of the brake lever.

14 Claims, 5 Drawing Sheets

(51) Int. Cl.
    *F16D 65/14*         (2006.01)
    *F16D 55/2255*     (2006.01)
    *F16D 121/14*      (2012.01)
    *F16D 125/32*      (2012.01)
    *F16D 125/26*      (2012.01)
    *F16D 125/28*      (2012.01)

(52) U.S. Cl.
    CPC ........ *F16D 65/183* (2013.01); *F16D 2121/14* (2013.01); *F16D 2125/26* (2013.01); *F16D 2125/28* (2013.01); *F16D 2125/32* (2013.01)

(58) Field of Classification Search
    CPC .......... F16D 55/21; F16D 55/33; F16D 55/39; F16D 55/41; F16D 65/18; F16D 2125/26
    USPC ....................................................... 188/72.9
    See application file for complete search history.

(56) References Cited

U.S. PATENT DOCUMENTS

| | | | | |
|---|---|---|---|---|
| 5,664,646 | A * | 9/1997 | Bejot | F16D 65/18 188/71.9 |
| 5,819,884 | A * | 10/1998 | Giering | F16C 19/502 188/71.9 |
| 5,927,445 | A | 7/1999 | Bieker et al. | |
| 6,293,370 | B1 * | 9/2001 | McCann | B60T 1/065 188/1.11 E |
| 7,175,005 | B2 * | 2/2007 | Larsson | F16D 55/224 188/72.1 |
| 7,506,732 | B2 * | 3/2009 | Antony | F16D 65/183 188/72.7 |
| 8,910,755 | B2 * | 12/2014 | Baumgartner | F16D 55/225 188/72.2 |
| 2001/0030090 | A1 * | 10/2001 | Thomas | F16D 55/227 188/72.9 |
| 2002/0014374 | A1 * | 2/2002 | Ortegren | F16D 65/183 188/72.1 |
| 2003/0091256 | A1 * | 5/2003 | Grell | C21D 9/14 384/575 |
| 2006/0185360 | A1 | 8/2006 | Takizawa et al. | |
| 2007/0256902 | A1 * | 11/2007 | Niehorster | F16D 65/18 188/72.9 |
| 2009/0045018 | A1 * | 2/2009 | Baumgartner | F16D 65/14 188/72.2 |
| 2017/0234388 | A1 * | 8/2017 | Adamczyk | F16D 65/183 188/72.9 |
| 2018/0187729 | A1 * | 7/2018 | Hidringer | F16D 55/2255 |
| 2018/0187732 | A1 * | 7/2018 | Beck | F16D 65/183 |

FOREIGN PATENT DOCUMENTS

| | | |
|---|---|---|
| DE | 23 34 154 A1 | 1/1975 |
| DE | 195 15 063 C1 | 2/1997 |
| DE | 102 60 597 A1 | 7/2004 |
| DE | 10 2012 108 670 A1 | 3/2014 |
| DE | 10 2012 108 689 A1 | 5/2014 |
| EP | 2 428 695 A1 | 3/2012 |
| KR | 10-2013-0135203 A | 12/2013 |
| WO | WO 2006/024512 A1 | 3/2006 |
| WO | WO 2013/180556 A1 | 12/2013 |

OTHER PUBLICATIONS

International Preliminary Search Report on Patentability (PCT/IB/373) issued in PCT Application No. PCT/EP2015/071261 dated Mar. 21, 2017, including English translation (German-language Written Opinion (PCT/ISA/217)) dated Mar. 17, 2017 (Seven (7) pages).

International Search Report (PCT/ISA/210) issued in PCT Application No. PCT/EP2015/071261 dated Dec. 1, 2015 with English translation (Four (4) pages).

German-language Written Opinion (PCT/ISA/237) issued in PCT Application No. PCT/EP2015/071261 dated Dec. 1, 2015 (Five (5) pages).

German-language Office Action issued in counterpart German Application No. 10 2014 113 370.6 dated Mar. 17, 2015 (Eight (8) pages).

* cited by examiner

DISK BRAKE FOR A UTILITY VEHICLE

CROSS REFERENCE TO RELATED APPLICATIONS

This application is a continuation of PCT International Application No. PCT/EP2015/071261, filed Sep. 16, 2015, which claims priority under 35 U.S.C. § 119 from German Patent Application No. 10 2014 113 370.6, filed Sep. 17, 2014, the entire disclosures of which are herein expressly incorporated by reference.

BACKGROUND AND SUMMARY OF THE INVENTION

The invention relates to a disk brake for a utility vehicle and to a brake caliper of a disk brake.

Disk brakes of said type are well known. For example, reference may be made to German patent document no. DE 195 15 063 C1, which discloses a generic axial disk brake in which, during a braking operation, a brake lever of a brake-application device acts on a bridge in which there are mounted two brake plungers, said brake plungers being arranged parallel to and spaced apart from one another and having in each case one thrust piece. Here, a lever arm of the brake lever projects into a dome integrally formed on a brake caliper.

A brake pad bearing against the thrust pieces is, during the braking operation, pressed against a brake disk, for which purpose the brake lever is pivoted by a pneumatically or electromechanically actuable tappet such that, via an eccentric which is connected to the brake lever and which is supported on the bridge, the bridge is displaced with the pressure plungers in the direction of the brake disk.

Opposite this, the brake lever is supported in a plain bearing arrangement which is provided on an inner side of the wall of the brake caliper so as to form a caliper head, wherein the wall forms a receiving space for the brake-application device, which brake-application device is inserted through an installation opening situated opposite the wall. The dome into which the lever arm, extending transversely with respect to the brake-application direction, of the brake lever projects is integrally formed with the unipartite brake caliper which is composed of cast iron.

The plain bearing arrangement at the wall side has a receptacle which is of channel-shaped and, in cross section, circular-arc-shaped form and extends transversely with respect to the pivoting direction.

In this receptacle, which is preferably lined with a bearing shell, there is positioned a pivoting body which may be in the form of a separate roller or of a bead integrally formed on the brake lever, which bead is, at least over the pivoting range, of circular-arc-shaped form corresponding to the curvature of the receptacle.

Here, a receptacle is formed into the caliper head, for which purpose, in the brake caliper, there is provided a lateral machining opening through which a machining tool, for example a milling tool, can be inserted.

For accurately positioned displacement of the bridge, exact positioning of the brake lever is necessary, which, with the hitherto known design, is however not ensured but is at best purely incidental and not permanent.

This can self-evidently give rise to problems with regard to the operational reliability of the brake-application device, because a small displacement of the brake lever transversely with respect to the pivoting direction leads to a changed engagement on the bridge, which adversely affects the operating behavior thereof.

Furthermore, there is the risk of uncontrolled loading of components involved, which components ultimately have an influence on the service life, that is to say the service life is reduced in relation to a situation with permanently exact guidance.

German patent document no. DE 10 2012 108 689 A1 has disclosed a radial disk brake in which a lever arm of the brake lever extends approximately parallel to the axis of rotation of the brake disk. For securing the brake lever in terms of displacement, securing elements are fastened to both sides of a pivoting body which is in the form of a roller, one of which securing elements is in the form of a shift fork which is operatively connected to a readjustment device, whereas the other securing element is formed from a holding plate.

The two securing elements are supported both on the brake lever and on a caliper head of the brake caliper, such that the pivoting body, and likewise the brake lever, are in effect clamped. It is however a disadvantage here that both securing elements bear with a relatively large contact surface against the caliper head, such that, during the pivoting of the brake lever, corresponding friction forces must be overcome.

From German patent document no. DE 10 2012 108 670 A1, it is known, for the purposes of securing the brake lever in terms of displacement, for parallel keys to be provided which bear against the lever arm of the brake lever outside a bearing arrangement on the brake caliper side and between which the lever arm is guided.

The invention is based on the object of further developing a disk brake and a brake caliper of the generic type such that the functional and operational reliability of the disk brake is improved with little outlay in terms of design and manufacture.

The invention ensures that the brake lever permanently assumes a defined position, that is to say a displacement perpendicular to the pivoting direction is ruled out.

This positive guidance prevents impairments in the operating behavior of the brake-application and considerably improves functional reliability.

In particular, the bridge is no longer subjected to load insofar as no lateral misalignment which could be attributed to a corresponding uncontrolled movement of the brake lever is possible. This is associated with a considerable lengthening of the service life of the components involved.

Since the lever is secured very close to the center of rotation of the lever, good hysteresis is promoted. Here, only the securing element according to the invention has to be attached as an additional component, whereas the other functional parts can be used in the known form, modified only insofar as a corresponding configuration for receiving the securing element must be provided.

For this purpose, both in the brake lever and in the receptacle of the caliper head for the mounting of the pivoting body, there is provided in each case one slot into which the securing element engages. It is also conceivable for the receptacle to be provided in at least one bearing block which is connected, as a separate component, to the wall of the brake caliper, wherein then, the slot is formed into the bearing block. In the case of two bearing blocks arranged adjacent to one another, the slot may be formed by a selected spacing between the two bearing blocks.

Said securing element may be in the form of a disk, parallel key or ring-shaped disk which engages into the slots adapted thereto, wherein, in one design variant, the ring-shaped disk is fastened to the pivoting body formed as a roller, and in another variant, said ring-shaped disk is recessed into a bead which forms the pivoting body and which is integrally formed on the brake lever, wherein said disk projects in each case into the slot of the caliper head or of the brake lever.

The disk, which may also have a shape which deviates from that of a circle, is very easy to produce, and exhibits very little wear in particular if it is composed of a hardened steel.

Instead of a separate securing element, said securing element may be integrally formed in the manner of a pin or disk on the bead or on the roller.

The mutually oppositely situated slots are preferably of circular-arc-shaped profile, wherein the imaginary center of rotation corresponds to that of the pivoting body or of the receptacle.

Thus, very simple machining of the caliper head is possible, because a milling cutter merely has to be inserted through the lateral machining opening of the brake caliper.

The dimensioning both of the receptacle, that is to say the radius of curvature thereof, and of the radius of curvature of the slot may be kept relatively small, such that the lateral machining opening, adapted thereto, can also be kept correspondingly small in terms of its diameter.

This serves primarily to ensure the stability of the brake caliper, because the machining opening, in principle, forms a point of weakened strength, which is thus reduced to an acceptable dimension.

Furthermore, the securing element and the recesses in the caliper head and brake lever, that is to say said slots, are dimensioned in terms of their width or thickness such that the securing element duly lies therein substantially without play but can be inserted easily and without problems.

Furthermore, multiple securing elements may be provided if required.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
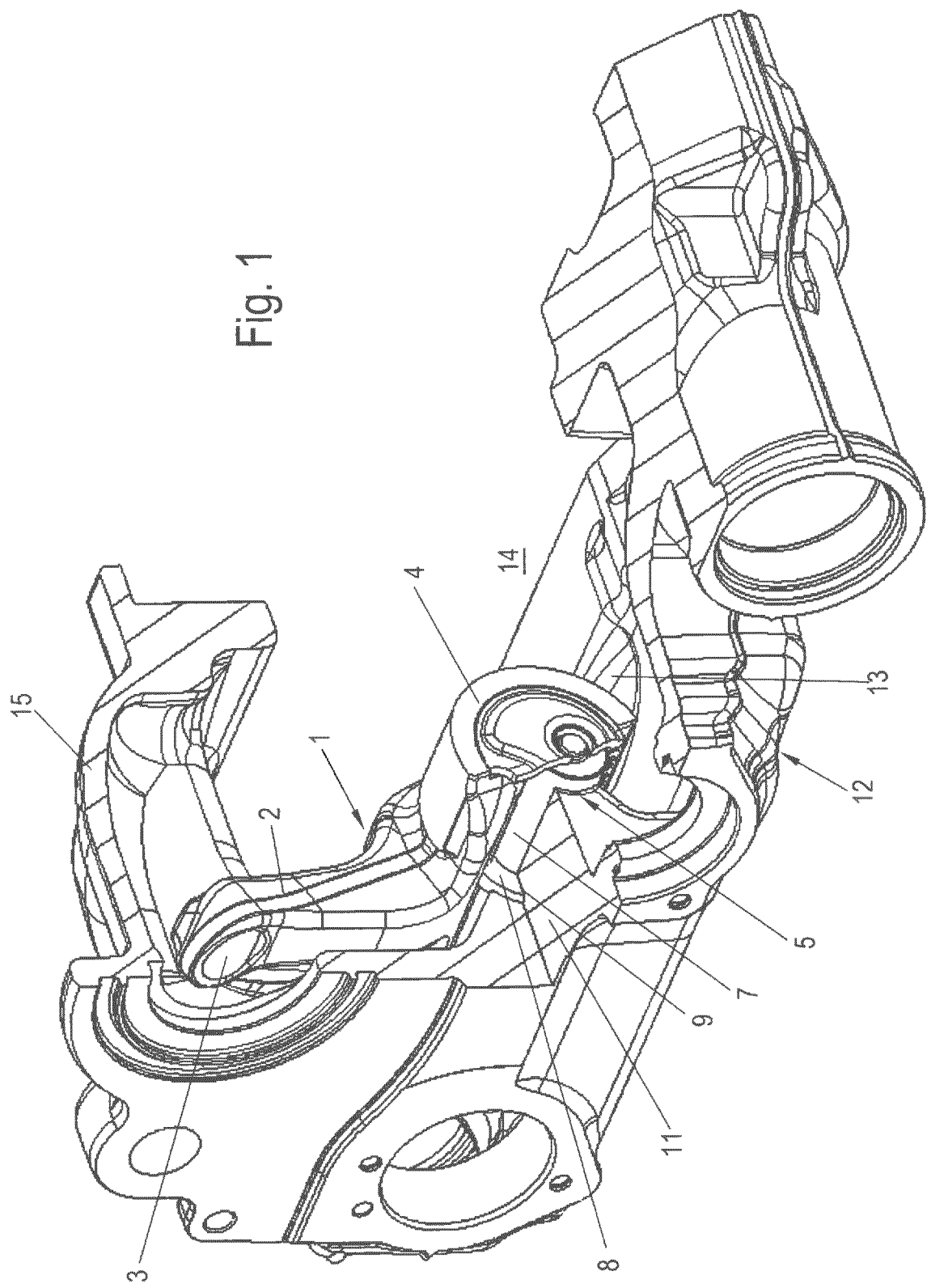
FIG. 1 shows a part of a disk brake according to an embodiment of the invention in a partially sectional perspective view.
Figure 2:
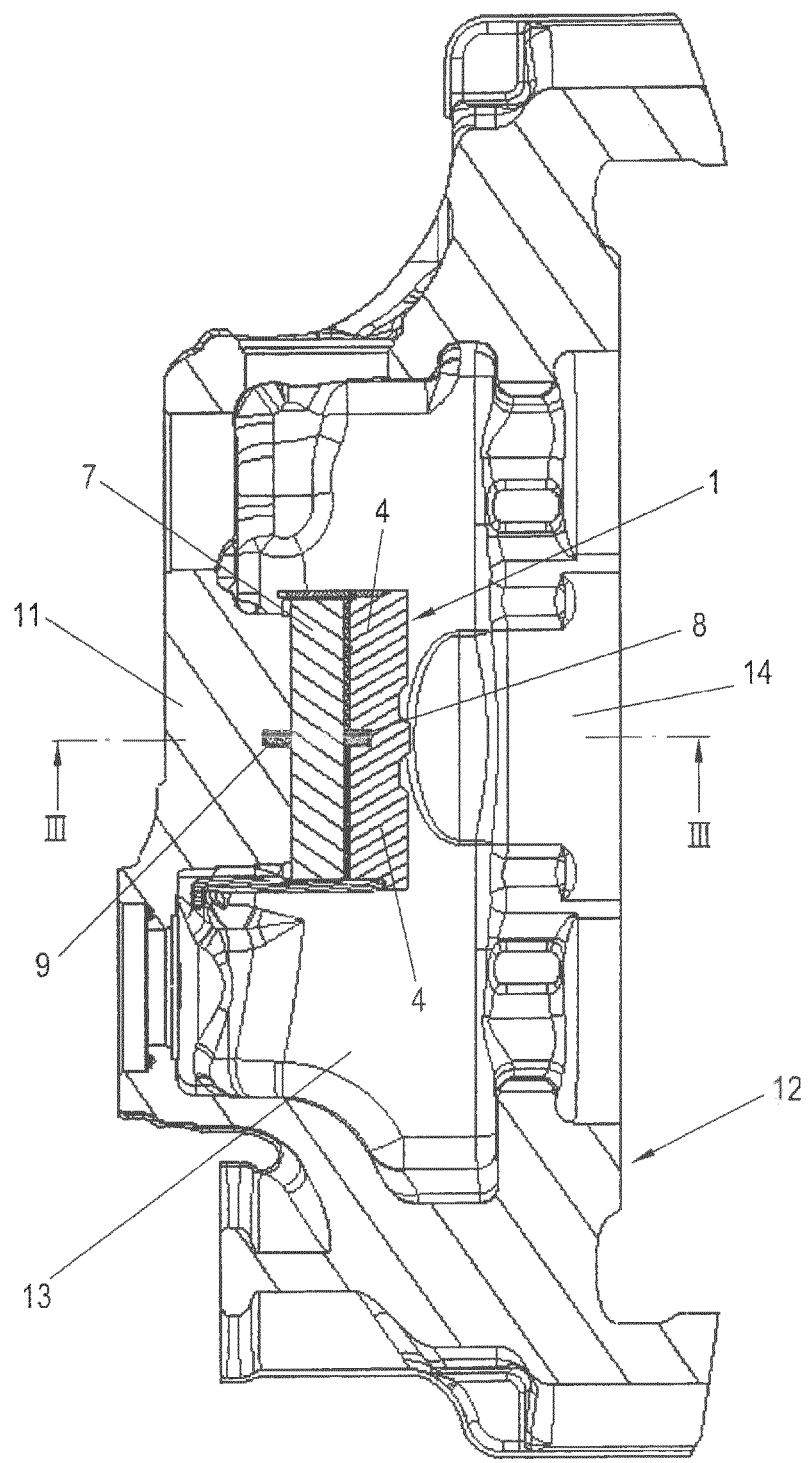
FIG. 2 shows a sectional plan view of the part as per FIG. 1.

The figures show, as part of a brake-application device of an axial disk brake, a brake lever 1 which has a lever arm 2 and an eccentric 4 adjoining said lever arm. Here, the lever arm 2, which extends transversely with respect to the brake-application direction, projects into an integrally formed dome 15 of a cast brake caliper 12.

On the end averted from the eccentric 4, the lever arm 2 is equipped with a spherical-cap-shaped depression 3 into which a tappet (not illustrated) of a brake cylinder, which is preferably pneumatically actuable, engages.

The eccentric 4 bears against a bridge (likewise not shown) which is mounted in displaceable fashion in a receiving chamber 13 of the brake caliper 12 and which bears the at least one brake plunger which, during a braking operation, can be pressed against a brake pad, for which purpose the brake lever 1 can be pivoted, such that the stroke of the eccentric 4 determines the displacement travel of the bridge.

At the other side, the brake lever 1 is supported on a caliper head 11 formed by the inner side of a wall of the brake caliper 12, which caliper head delimits the receiving chamber 13 and opposite which caliper head there is provided an installation opening 14 through which functional parts such as the bridge and the brake lever 1 can be inserted into the receiving chamber 13. The caliper head 11 is merely schematically indicated in FIGS. 4 and 5.

Figure 4:
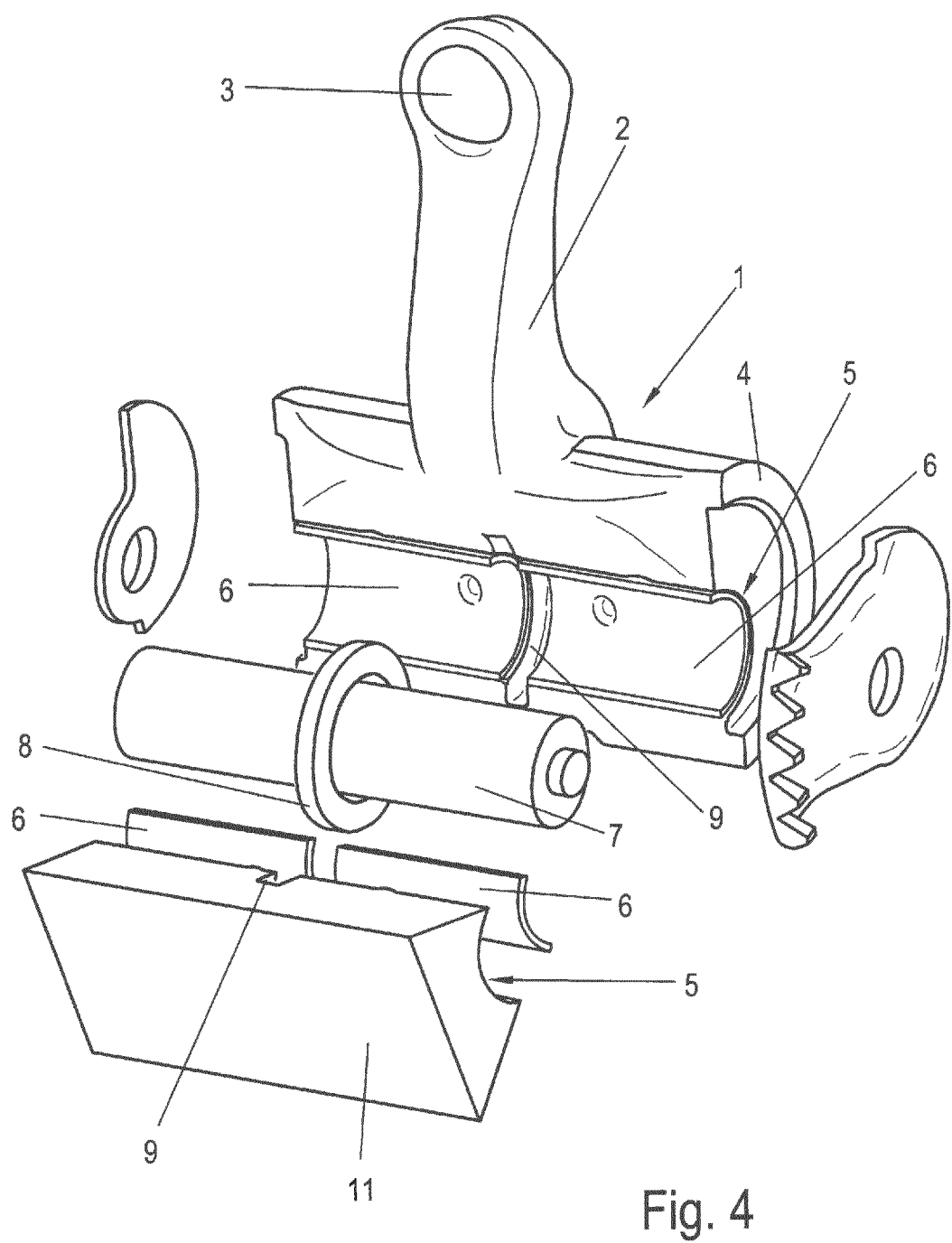
FIG. 4 shows a detail of the disk brake according to the FIG. 1 embodiment of invention in a schematic, perspective view.

In the region of abutment of the brake lever 1 against the caliper head 11, there is provided a pivot bearing in the form of a plain bearing, having a receptacle 5 of circular-arc-shaped cross section in the caliper head 11 and having a pivoting body which, in the embodiment as per FIGS. 1 and 4, is composed of a roller 7. In this variant, the roller 7 is situated opposite the caliper head 11 in a receptacle 5 of the brake lever 1, which, like the receptacle 5 of the caliper head 11, is lined with bearing shells 6 which are designed such that only low sliding friction arises during the pivoting movement.

For the purposes of securing the brake lever 1 in terms of displacement, a securing element is provided between said brake lever and the caliper head 11, which securing element engages in positively locking fashion into the brake lever 1 at one side and into the caliper head 11 at the other side. Here, the securing element is arranged in the region of the pivoting body which extends axially to both sides of said securing element, and said securing element at least regionally protrudes radially relative to said pivoting body.

In the examples, the securing element is in the form of a ring-shaped disk 8 which is mounted on the roller 7 and which engages into slots 9 which, like the receptacles 5, are of circular-arc-shaped form, wherein the receptacles 5, the roller 7, the slots 9 and the ring-shaped disk 8 each have the same central point.

The radius of the slots 9 preferably corresponds to the outer radius of the ring-shaped disk 8, though may also be slightly larger. The thickness of the ring-shaped disk 8 and the width of the slots 9 are however approximately equal.

Figure 3:
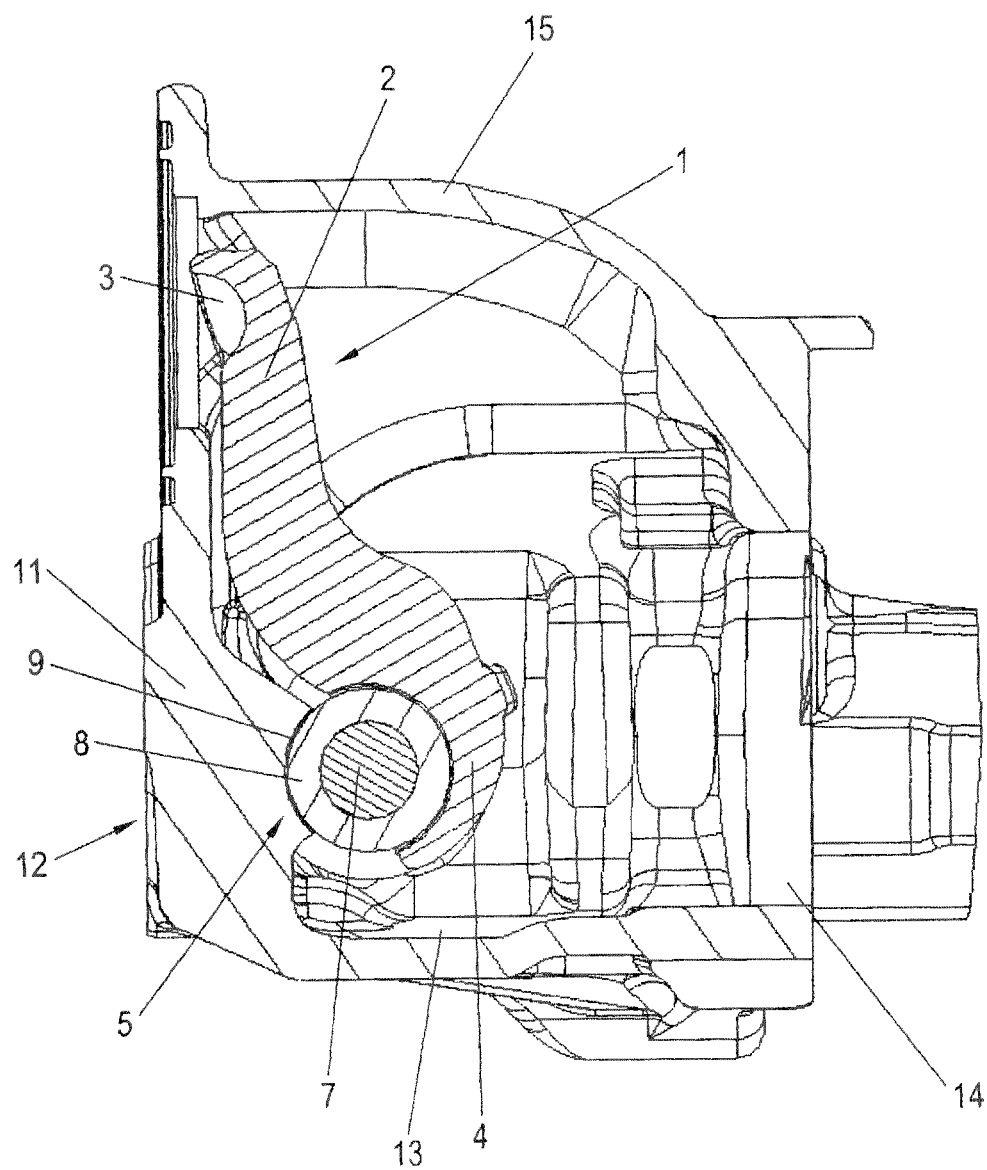
FIG. 3 shows a section through the disk brake as per the line in FIG. 2.

In particular, it can be clearly seen in FIGS. 1 and 3 that the brake-caliper-side slot 9 is recessed into the inner side of that wall of the brake caliper which is situated opposite the installation opening 14, wherein the slot 9 extends in the pivoting direction, that is to say toward the dome 15. Furthermore, after the functional parts have been installed, the installation opening 14 is closed off by a closure cover, as is known from the prior art.

In the example of FIG. 4, the ring-shaped disk 8 is merely pushed onto the roller 7 without being fastened thereto. It is however also conceivable for the ring-shaped disk 8 to be fixedly connected to the roller 7. The ring-shaped disk 8 is preferably guided on the roller 7 with a clearance fit.

Figure 5:
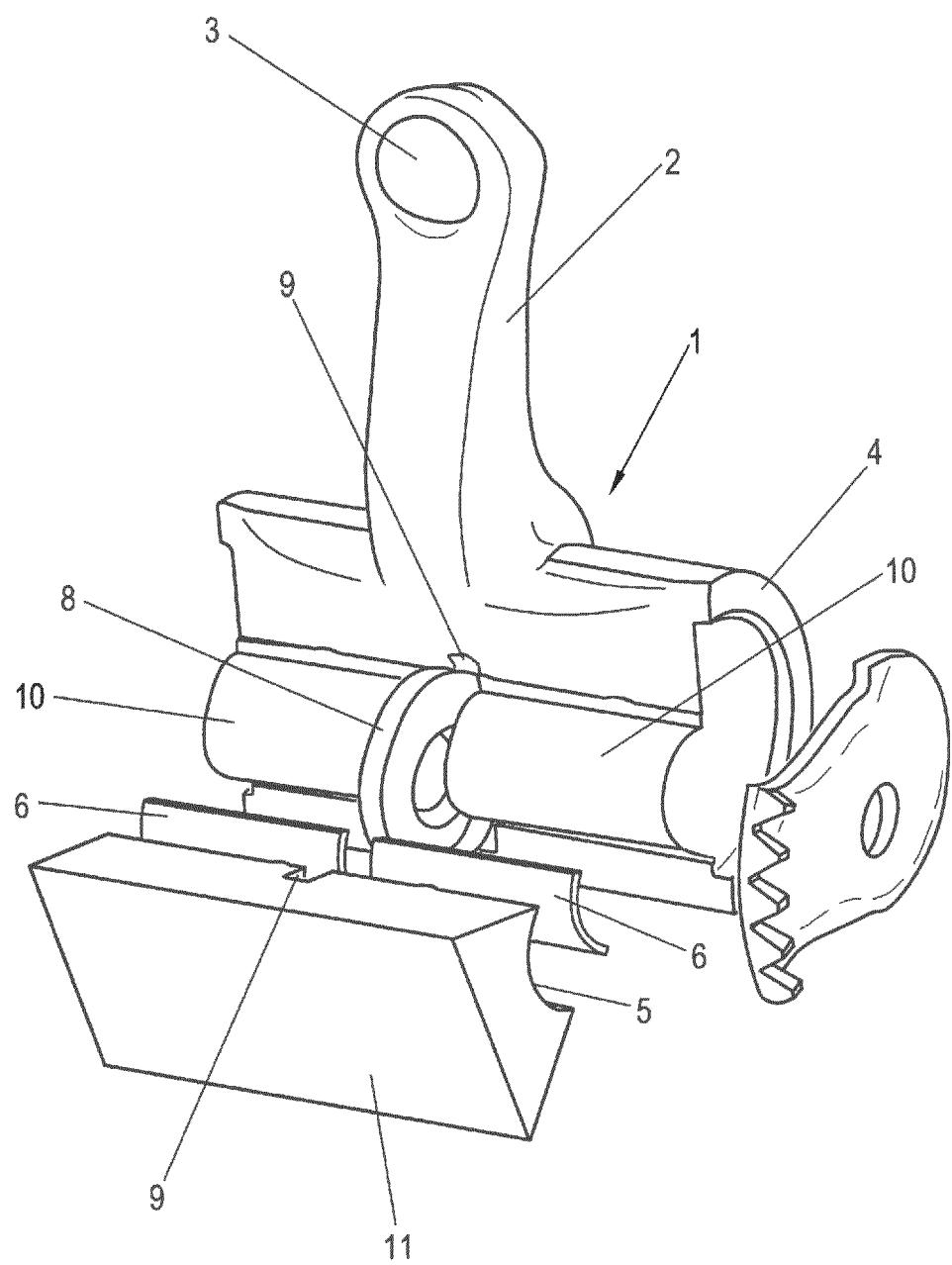
FIG. 5 shows another embodiment of the invention corresponding to the illustration in FIG. 4.

By contrast to the variant as per FIG. 4, it is the case in the embodiment shown in FIG. 5 that the pivoting body is formed as a bead 10 which is of circular-arc-shaped form in cross section and which is integrally formed on the brake lever 1 and which likewise extends transversely with respect to the pivoting direction, wherein the slot 9 is guided by said bead 10 as far as into the adjoining region of the brake lever 1.

Instead of a ring-shaped disk 8, the securing element may be integrally formed on the bead 10 in radially protruding fashion so as to engage into the slot 9 on the caliper head.

As mentioned, the securing element may also be provided in some form other than the ring-shaped disk 8. It is essential that the brake lever 1 and the caliper head 11 have a positively locking connection to one another transversely with respect to the pivoting direction of the brake lever 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disk brake for a utility vehicle, comprising:
   a brake caliper configured to straddle a brake disk when in an installed position, the brake caliper including
      a receiving chamber;
      a brake-application device being arranged in the receiving chamber and having a brake lever configured to be pivotable about a brake lever pivot axis;
      a pivot bearing; and
      a brake lever securing element arranged to cooperate with the pivot bearing to limit displacement of the brake lever along the brake lever pivot axis,
   wherein
      the brake lever is configured to be supported at a first side by the pivot bearing against a wall of a caliper head of the brake caliper and at a second side by a bridge,
      the pivot bearing includes a pivoting body configured to be pivotably located in a circular-arc-shaped receptacle in contact with the pivot bearing on at least one of a caliper head side and a bridge side of the pivoting body,
      the securing element is arranged between axially-extending portions of the pivoting body,
      the securing element protrudes radially outward away from an outer surface of the pivoting body and is configured to cooperate with a corresponding receptacle-side circular-arc-shaped recess in the circular-arc-shaped receptacle to permit circumferential movement of the securing element about the brake lever pivot axis while limiting movement of the securing element along the brake lever pivot axis, the circular-arc-shaped recess extending radially outward relative to the brake lever pivot axis beyond a radially outermost surface of the circular-arc-shaped receptacle, and
      the securing element engages in positively locking fashion into the brake lever and the receptacle-side circular-arc-shaped recess.

2. The disk brake as claimed in claim 1, wherein the securing element is formed as a disk.

3. The disk brake as claimed in claim 2, wherein the securing element is formed as a ring-shaped disk having a constant outer radius.

4. The disk brake as claimed in claim 1, wherein
   the securing element is formed as a parallel key configured to which engage into a key recess of the brake lever and the receptacle-side circular-arc-shaped recess, and
   the securing element engages in positively locking fashion into the brake lever and the receptacle-side circular-arc-shaped recess.

5. The disk brake as claimed in claim 3, wherein
   the pivoting body is a roller, and
   the ring-shaped disk is guided on the roller.

6. The disk brake as claimed in claim 5, wherein the roller and the ring-shaped disk are configured such that the ring-shaped disk is either guided loosely or fixed on the roller.

7. A disk brake for a utility vehicle, comprising:
   a brake caliper configured to straddle a brake disk when in an installed position, the brake caliper including
      a receiving chamber;
      a brake-application device being arranged in the receiving chamber and having a brake lever configured to be pivotable about a brake lever pivot axis;
      a pivot bearing; and
      a brake lever securing element arranged to cooperate with the pivot bearing to limit displacement of the brake lever along the brake lever pivot axis,
   wherein
      the brake lever is configured to be supported at a first side by the pivot bearing against a wall of a caliper head of the brake caliper and at a second side by a bridge,
      the pivot bearing includes a pivoting body configured to be pivotably located in a circular-arc-shaped receptacle in contact with the pivot bearing on at least one of a caliper head side and a bridge side of the pivoting body,
      the securing element is arranged between axially-extending portions of the pivoting body,
      the securing element protrudes radially outward away from an outer surface of the pivoting body and is configured to cooperate with a corresponding receptacle-side circular-arc-shaped recess in the circular-arc-shaped receptacle to permit circumferential movement of the securing element about the brake lever pivot axis while limiting movement of the securing element along the brake lever pivot axis, the circular-arc-shaped recess extending radially outward relative to the brake lever pivot axis beyond a radially outermost surface of the circular-arc-shaped receptacle,
      the pivoting body is formed as an integrally formed bead of the brake lever extending parallel to the brake lever rotation axis,
      the securing element is a ring-shaped disk, and
      the brake lever bead includes a bead-side circular-arc-shaped recess configured to receive a first portion of the ring-shaped disk while a second portion of the ring-shaped disk is engaged with the receptacle-side circular-arc-shaped recess.

8. The disk brake as claimed in claim 7, wherein the securing element is integrally formed on the integrally formed bead of the brake lever.

9. A disk brake for a utility vehicle, comprising:
   a brake caliper configured to straddle a brake disk when in an installed position, the brake caliper including
      a receiving chamber;

a brake-application device being arranged in the receiving chamber and having a brake lever configured to be pivotable about a brake lever pivot axis;

a pivot bearing; and a brake lever securing element arranged to cooperate with the pivot bearing to limit displacement of the brake lever along the brake lever pivot axis, wherein the brake lever is configured to be supported at a first side by the pivot bearing against a wall of a caliper head of the brake caliper and at a second side by a bridge, the pivot bearing includes a pivoting body configured to be pivotably located in a circular-arc-shaped receptacle in contact with the pivot bearing on at least one of a caliper head side and a bridge side of the pivoting body, the securing element is arranged between axially-extending portions of the pivoting body, the securing element protrudes radially outward away from an outer surface of the pivoting body and is configured to cooperate with a corresponding receptacle-side circular-arc-shaped recess in the circular-arc-shaped receptacle to permit circumferential movement of the securing element about the brake lever pivot axis while limiting movement of the securing element along the brake lever pivot axis, the circular-arc-shaped recess extending radially outward relative to the brake lever pivot axis beyond a radially outermost surface of the circular-arc-shaped receptacle, the circular-arc-shaped receptacle on at least one of a caliper head side and a bridge side of the pivoting body faces a corresponding circular-arc-shaped receptacle on the other of the at least one of the caliper head side and the bridge side of the pivoting body configured to receive the securing element, and the brake lever and the caliper head each have one of the circular-arc-shaped receptacles.

10. The disk brake as claimed in claim 1, wherein the caliper head has at least one of at least one bearing block having the circular-arc-shaped receptacle in which the receptacle-side circular-arc-shaped recess is formed, and two bearing blocks arranged along the brake lever rotation axis with the receptacle-side recess being formed in an axial space between the two bearing blocks.

11. The disk brake as claimed in claim 1, wherein an axis of rotation of the pivoting body, a radius of curvature of the receptacle-side recess and a radius of curvature of the receptacle are co-axial.

12. The disk brake as claimed in claim 3, wherein an axial thickness of the ring-shaped disk corresponds to a width of the receptacle-side recess, such that the ring-shaped disk is movable in the circumferential direction without play.

13. The disk brake as claimed in claim 3, wherein a radius of curvature of the receptacle-side recess corresponds at least to an outer radius of the ring-shaped disk.

14. The disk brake as claimed in claim 3, wherein the ring-shaped disk is composed of hardened steel.

\* \* \* \* \*